US011483055B2

(12) United States Patent
Luo et al.

(10) Patent No.: US 11,483,055 B2
(45) Date of Patent: Oct. 25, 2022

(54) USER EQUIPMENT AND BEAM FAILURE RECOVERY METHOD

(71) Applicants: Sharp Kabushiki Kaisha, Sakai (JP); FG Innovation Company Limited, Tuen Mun (HK)

(72) Inventors: Chao Luo, Shanghai (CN); Shohei Yamada, Sakai (JP); Renmao Liu, Shanghai (CN)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/960,339

(22) PCT Filed: Dec. 21, 2018

(86) PCT No.: PCT/CN2018/122660
§ 371 (c)(1),
(2) Date: Jul. 7, 2020

(87) PCT Pub. No.: WO2019/137184
PCT Pub. Date: Jul. 18, 2019

(65) Prior Publication Data
US 2021/0058134 A1    Feb. 25, 2021

(30) Foreign Application Priority Data

Jan. 9, 2018    (CN) .......................... 201810020860.X

(51) Int. Cl.
*H04B 7/08*     (2006.01)
*H04W 76/19*    (2018.01)
(Continued)

(52) U.S. Cl.
CPC ............ *H04B 7/088* (2013.01); *H04W 16/28* (2013.01); *H04W 74/0833* (2013.01); *H04W 76/19* (2018.02)

(58) Field of Classification Search
CPC ........ H04B 7/088; H04B 7/0695; H04B 7/06; H04B 7/08; H04B 7/086; H04B 7/0617;
(Continued)

(56) References Cited

U.S. PATENT DOCUMENTS

2019/0200396 A1* 6/2019 Agiwal ................. H04L 5/0035
2019/0208436 A1* 7/2019 Zhou ..................... H04L 1/1819
2020/0389847 A1* 12/2020 Deng ................... H04B 7/0617

OTHER PUBLICATIONS

Official Communication issued in International Patent Application No. PCT/CN2018/122660, dated Feb. 27, 2019.
(Continued)

*Primary Examiner* — Fred A Casca
(74) *Attorney, Agent, or Firm* — Keating & Bennett, LLP

(57) ABSTRACT

The present invention provides user equipment and a beam failure recovery method. The beam failure recovery method for user equipment (UE), includes: receiving indication of beam failure instance; accumulating the number of received indications so as to obtain an accumulative value; initiating a beam failure recovery procedure when the accumulative value is greater than a first threshold; and skipping processing the received indication of beam failure instance during the beam failure recovery period. Thus, it is possible to eliminate false beam failures.

2 Claims, 10 Drawing Sheets

(51) Int. Cl.
*H04W 16/28* (2009.01)
*H04W 74/08* (2009.01)

(58) Field of Classification Search
CPC .. H04B 7/0452; H04B 7/0626; H04B 7/0456;
H04B 7/0413; H04B 7/0632; H04B
7/0639; H04B 7/024; H04B 7/0417;
H04B 7/043; H04B 7/0619; H04B
7/0469; H04B 7/04; H04B 7/0408; H04B
7/0697; H04B 7/0897; H04B 7/10; H04B
7/02; H04W 76/19; H04W 16/28; H04W
74/0833; H04W 24/04; H04W 48/20;
H04L 5/0048; H04L 5/0023; H04L
25/0204
See application file for complete search history.

(56) References Cited

OTHER PUBLICATIONS

Ericsson, "Beam failure recovery mechanism", 3GPP TSG-RAN WG1 #89, R1-1708678, May 15-19, 2017, pp. 1-8.
MediaTek Inc., "Further Details on Beam Failure Recovery", 3GPP TSG RAN WG1 Meeting #91, R1-1719566, Nov. 27-Dec. 1, 2017, 6 pages.
NTT Docomo, "New SID Proposal: Study on New Radio Access Technology", 3GPP TSG RAN Meeting #71, RP-160671, Mar. 7-10, 2016, 8 pages.

\* cited by examiner

USER EQUIPMENT AND BEAM FAILURE RECOVERY METHOD

TECHNICAL FIELD

The present invention relates to the technical field of wireless communication, and in particular, to user equipment and a beam failure recovery method.

BACKGROUND

In March 2016, at the 3rd Generation Partnership Project (3GPP) RAN #71 Plenary Session, NTT DOCOMO proposed a new research project on 5G technology standards (see Non-Patent Document 1), and it was approved. The goal of the research project is to develop a New Radio (NR) access technology to meet all of the application scenarios, requirements, and deployment environments of 5G. NR mainly has three application scenarios: Enhanced Mobile Broadband Communication (eMBB), massive Machine Type Communication (mMTC), and Ultra Reliable and Low Latency Communication (URLLC). According to the planning of the research project, the standardization of NR is conducted in two stages: the first-stage standardization will be completed by the middle of 2018; the second-stage standardization will be completed by the end of 2019. The first-stage standard specifications need to be forward-compatible with the second-stage standard specifications, while the second-stage standard specifications need to be established on the basis of the first-stage standard specifications and to meet all requirements of 5G NR technical standards.

A big difference between 5G and 4G is that 5G supports bands higher than 6 GHz (up to 100 GHz). In these bands, the path loss of the wireless signal is very high, which greatly reduces the signal coverage. The solution to this problem is to utilize large-scale antenna arrays and beam forming (also known as beamforming). Beamforming is a signal processing technique that combines signals transmitted to individual antenna elements in an antenna array so that the signals strengthen each other in certain directions and cancel each other in certain directions, thereby concentrating all the energy of the electromagnetic radiation in a given direction (referred to as a "beam").

Beams operating at high frequencies are prone to signal blockage due to movement and rotation of user equipment (UE), obstacles, and so on. This is referred to as a beam failure in 5G systems. In order to recover from the beam failure, a base station can configure some reference signals, such as Channel State Information-Reference Signals (CSI-RSs), or Synchronization Signal/Physical Broadcast Channel (SS/PBCH) blocks for the UE in a connected state. Each reference signal resource can respectively adopt the same beam as adopted by one of the Control Resource Sets (CORESETs) which the UE is monitoring (the base station can configure one or a plurality of CORESETs for UEs used for monitoring the PDCCH channel, which is referred to as the "serving CORESETs," or operating CORESETs; and the beams used by these CORESETs may be referred to as "serving beams," or operating beams). The UE determines the link quality corresponding to the respective beam by measuring the reference signals. If the measured values (indicated by an error probability) of the reference signals used for beam failure measurement corresponding to all CORESETs that the UE is monitoring are greater than a threshold, then the UE considers that a "beam failure instance" has occurred. A Radio Resource Control (RRC) parameter is defined in the system: Beam-Failure-Instance-MaxCount; if the number of beam failure instances consecutively occurred (stored in the beam failure instance counter, and recorded as the Beam-Failure-Instance-Count herein) is greater than the Beam-Failure-Instance-Max-Count, it is considered that a beam failure has occurred. In this case, the UE may initiate a "beam failure recovery" process: selecting a good quality beam from the measured beams, and transmitting a "beam failure recovery request" to the base station through the uplink channel resource pre-associated with the beam. After receiving the request, the base station transmits a response with the corresponding downlink beam. The UE monitors a CORESET specially configured for beam failure recovery for this response, and if a response can be received, it is an indication that it has recovered from the beam failure.

In addition, the 5G system also defines a timer: beamFailureRecoveryTimer, which is used to monitor whether the "beam failure recovery process" is successful. The timer is initiated with the initiating of the beam failure recovery process. If the timer expires, it is an indication that the beam failure cannot be recovered within the set time, i.e., the "beam failure recovery process" fails; otherwise, if the "beam failure recovery process" has succeeded before the timer expires then the UE stops the timer.

The foregoing process involves interaction between a physical layer entity and a Medium Access Control (MAC) layer entity in a 5G system. For example, the physical layer entity performs measurement of a reference signal and indicates a "beam failure instance" to the MAC layer entity.

For example, in the above process, the processing of the "beam failure instance" received by the MAC layer entity of the UE can be described as follows using the language in the MAC protocol:

```
1> if a beam failure instance has been received from lower layers:
    2> increment Beam-Failure-Instance-Count by 1;
    2> if Beam-Failure-Instance-Count exceeds
    Beam-Failure-Instance-MaxCount:
        3> reset Beam-Failure-Instance-Count;
        3> start beamFailureRecoveryTimer;
        3> initiate a Random Access procedure.
```

The processing of the timer beamFailureRecoveryTimer expiration can be described as follows using the language in the MAC protocol:

```
1> if the beamFailureRecoveryTimer expires:
    2> indicate beam failure recovery failure to upper layers.
```

The processing of the UE MAC layer entity receiving the response to the "beam failure recovery request" can be described as follows using the language in the MAC protocol:

```
...
1> if PDCCH transmission is addressed to the C-RNTI; and
1> if the contention free Random Access Preamble for beam failure
recovery request was transmitted by the MAC entity:
    2> stop beamFailureRecoveryTimer;
    2> consider the Random Access procedure successfully completed.
```

A problem with the beam failure handling mechanisms in the prior art is that false beam failures are prone to occur. For example, even if the beam failure instance occurs intermittently (such as once in ten minutes), no beam failure occurs in this case, but the system in the prior art will still accumulate the beam failure instance counter (Beam-Failure-Instance-Count). When the counter exceeds the Beam-Failure-Instance-MaxCount, it is still considered that a beam failure has occurred. Therefore, a solution that can eliminate various false beam failures is needed.

PRIOR ART DOCUMENT

Non-Patent Document

Non-Patent Document 1: RP-160671, New SID Proposal: Study on New Radio Access Technology

SUMMARY OF INVENTION

In order to address at least some of the above problems, the present invention provides user equipment and a beam failure recovery method, so as to facilitate appropriate avoidance of false beam failures.

According to one aspect of the present invention, a beam failure recovery method for user equipment (UE) is provided, comprising: receiving an indication of beam failure instance; accumulating the number of received indications so as to obtain an accumulative value; initiating a beam failure recovery procedure when the accumulative value is greater than a first threshold; and skipping processing the received indication of beam failure instance during the beam failure recovery period.

According to another aspect of the present invention, a beam failure recovery method for user equipment (UE) is provided, comprising: receiving an indication of beam failure instance; accumulating the number of received indications so as to obtain an accumulative value; initiating the beam failure recovery procedure when the accumulative value is greater than a first threshold; and adjusting the accumulative value if no other indication is received within a time duration equal to a second threshold since the reception of the indication.

According to another aspect of the present invention, a beam failure recovery method for user equipment (UE) is provided, comprising: receiving an indication of beam failure instance; accumulating the number of received indications so as to obtain an accumulative value; initiating a beam failure recovery procedure when the accumulative value is greater than a first threshold; and adjusting the accumulative value if the accumulative value accumulated within a given time, i.e., within the range of a second threshold is not greater than the first threshold.

According to another aspect of the present invention, a beam failure recovery method for user equipment (UE) is provided, comprising: receiving an indication of beam failure instance; accumulating the number of received indications so as to obtain an accumulative value; and starting timing when the accumulative value reaches a first threshold, and initiating a beam failure recovery procedure when the elapsed time is greater than or equal to a given time, i.e., a second threshold.

In some examples, the method further comprises: receiving an indication of beam success instance; accumulating the number of received indication of beam success instance so as to obtain an accumulative value; and stopping the timing of the elapsed time when the accumulative value is greater than or equal to a third threshold.

In some examples, the second threshold is a fixed value or a parameter configured by an upper layer protocol.

In some examples, adjusting the accumulative value comprises: setting the accumulative value by the last beam failure instance indication to zero.

In some examples, if all measured values of reference signals used for beam failure measurement are less than a predetermined error rate, or if one or more of the measured values of the reference signals used for beam failure measurement are less than the predetermined error rate, or if at least one instance of Downlink Control Information (DCI) transmitted to the UE is detected in a configured control resource set, receive an indication of beam success instance.

In some examples, the configured control resource set may be an operating control resource set, or a control resource set specially configured for beam failure recovery, or a combination of the two.

In some examples, the first threshold is a fixed value, or a parameter configured by an upper layer protocol; and the third threshold is a fixed value or a parameter configured by an upper layer protocol.

According to another aspect of the present invention, user equipment (UE) is provided, comprising: a processor; and a memory, the memory having instructions stored thereon, wherein the instructions, when executed by the processor, perform the beam failure recovery method as described above.

According to the present invention, it is possible to appropriately avoid the occurrence of false beam failures.

BRIEF DESCRIPTION OF DRAWINGS

The above and other features of the present invention will be more pronounced through the following detailed description taken in conjunction with the accompanying drawings.

DETAILED DESCRIPTION OF EMBODIMENTS

Figure 1A:
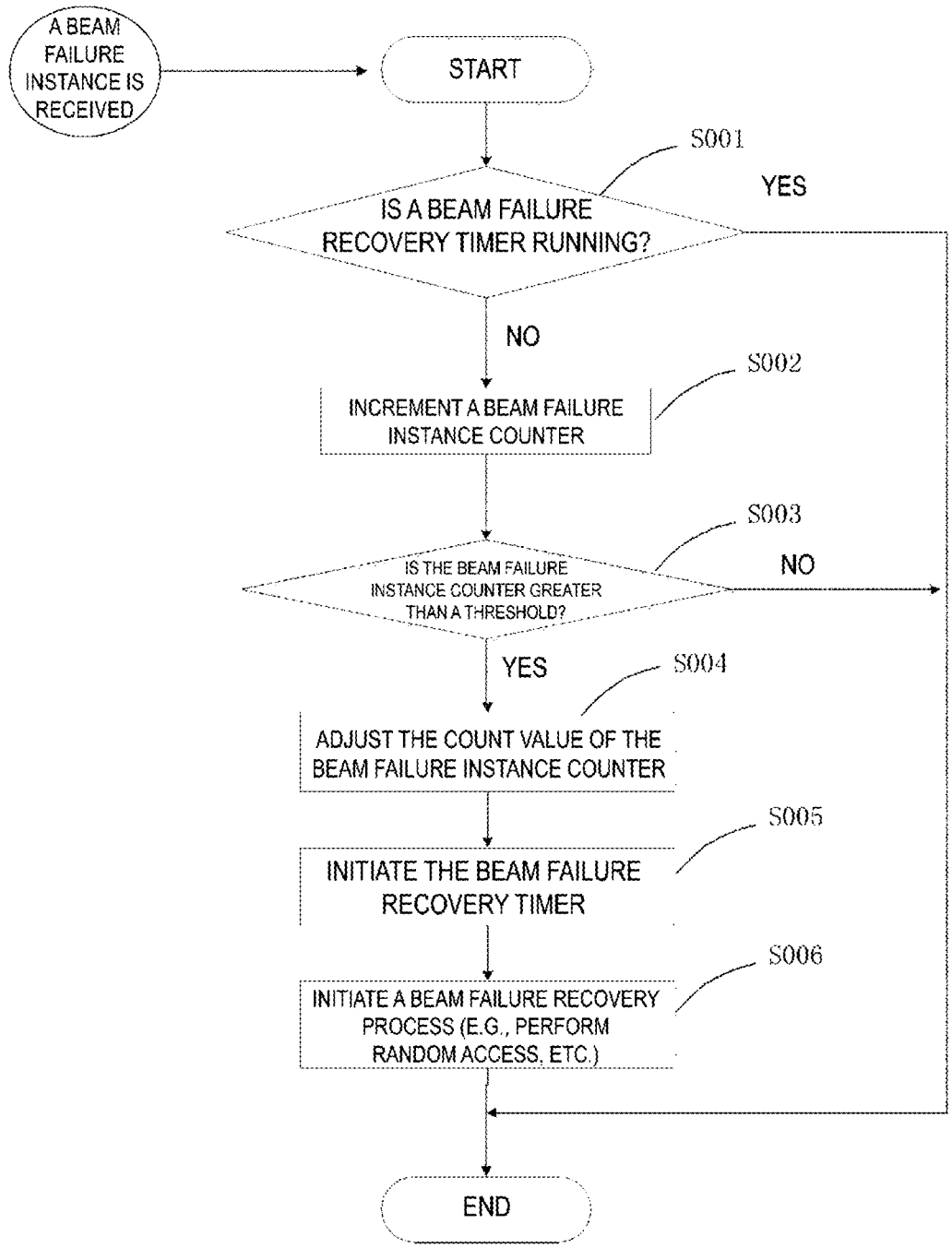
FIG. 1A is a flow chart showing a beam failure recovery method according to an embodiment of the present invention.

The following describes the present invention in detail with reference to the accompanying drawings and specific embodiments. It should be noted that the present invention is not limited to the specific embodiments described below. In addition, for simplicity, detailed description of the known art not directly related to the present invention is omitted to prevent confusion with respect to the understanding of the present invention.

In the following description, a 5G mobile communication system and its subsequently evolved versions are used as illustrative application environments to set forth a plurality of embodiments according to the present invention in detail. However, it is to be noted that the present invention is not limited to the following embodiments, and rather, it is applicable to many other wireless communication systems, such as a communication system later than 5G and a 4G mobile communication system earlier than the 5G.

Some terms involved in the present invention are described below. Unless otherwise specified, the terms used in the present invention adopt the definitions herein. The terms given in the present invention may be named differently in LTE, LTE-Advanced, LTE-Advanced Pro, NR, and later communication systems, but unified terms are adopted in the present invention. When applied to a specific system, the terms may be replaced with terms adopted in the corresponding system.

LTE-A: Long Term Evolution-Advanced
UE: User Equipment
CSI-RS: Channel State Information-Reference Signal
RE: Resource Element
CP-OFDM: Cyclic Prefix-Orthogonal Frequency Division Multiplexing
DFT-s-OFDM: Discrete Fourier Transform-spread-Orthogonal Frequency Division Multiplexing
RS: Reference Signal
NR: New Radio
EPRE: Energy Per Resource Element
PSS: Primary Synchronization Signal
SSS: Secondary Synchronization Signal
PBCH: Physical Broadcast Channel
RRC: Radio Resource Control
MAC: Medium Access Control
DCI: Downlink Control Information In one embodiment of the present invention, a beam failure recovery timer (beamFailureRecoveryTimer) is utilized to eliminate false beam failures.

In this embodiment, if the timer beamFailureRecoveryTimer is not running, then the related processing of beam failure detection and recovery is performed. For example, when the MAC layer entity of the UE receives an indication of "beam failure instance" from the lower layers, the number of received indications is accumulated so as to obtain an accumulative value, and for another example, the beam failure recovery procedure is initiated when the accumulative value is greater than a first threshold (Beam-Failure-Instance-MaxCount). These processes are not performed if the timer beamFailureRecoveryTimer is running For example, using the language in the MAC protocol, the scheme can be described as follows:

---

1> if a beam failure instance has been received from lower layers, and;
1> if beamFailureRecoveryTimer is not running:
    2> increment Beam-Failure-Instance-Count by 1;
    2> if Beam-Failure-Instance-Count exceeds Beam-Failure-Instance-MaxCount:
        3> reset Beam-Failure-Instance-Count;
        3> start beamFailureRecoveryTimer;
        3> initiate a Random Access procedure.

---

Figure 1B:
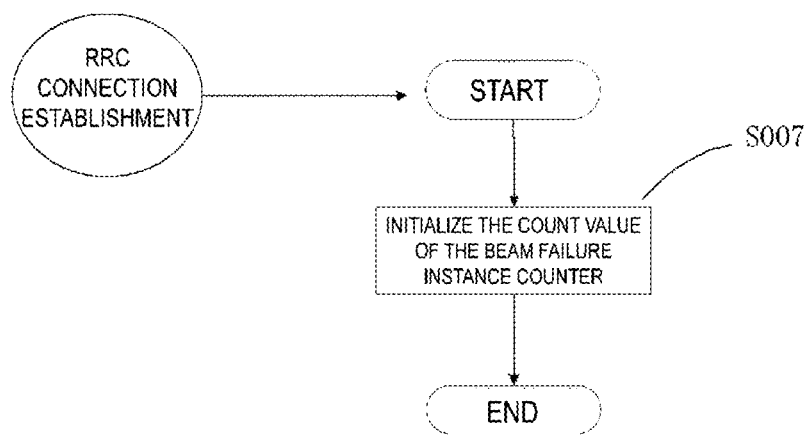
FIG. 1B is a flow chart showing a beam failure recovery method according to an embodiment of the present invention.

FIG. 1A and FIG. 1B are flow charts showing a beam failure recovery method according to an embodiment of the present invention.

As shown in FIG. 1A, when an indication of beam failure instance is received, the process proceeds to Step S001. In Step S001, it is determined whether the beam failure recovery timer (beamFailureRecoveryTimer) is running. If the beam failure recovery timer is running (Step S001, "YES"), then the process is ended. If the beam failure recovery timer is not running (Step S001, "NO"), then the process proceeds to Step S002, to increment the count value of the beam failure instance counter (Beam-Failure-Instance-Count). If it is determined in Step S003 that the count value of the beam failure instance counter is greater than the threshold (Step S003, "YES"), then the count value of the beam failure instance counter is adjusted (Step S004); the beam failure recovery timer is initiated (Step S005); and the beam failure recovery process (such as performing random access, etc.) is initiated (Step S006).

In this embodiment, as shown in FIG. 1B, when the RRC connection is established, the count value of the beam failure instance counter is initialized (Step S007).

As described above, in an embodiment of the present invention, in the user equipment (UE), when an indication of beam failure instance is received, the number of received indications is accumulated so as to obtain an accumulative value, and when the accumulative value is greater than the first threshold, the beam failure recovery procedure is initiated. During the beam failure recovery period, the received indication of beam failure instance is not processed, and accumulation is not performed.

According to this embodiment, it is monitored whether it is in the beam failure recovery period, and if it is in the beam failure recovery period, the received beam failure instance (s) may be meaningless, and it is not necessary to continue the beam failure determination. With the existing determination beam failure recovery timer, false beam failures received during the beam failure recovery period can be eliminated.

In the following, when specific examples are provided to illustrate other preferred embodiments of the present invention, description is provided by using the example where the timer beamFailureRecoveryTimer is used to determine whether it is in the beam failure recovery period or not and further processing is performed while it is not in the beam failure recovery period. Certainly, the following specific examples and embodiments may not perform such determination of the beam failure recovery period. Further, for the method of determining the beam failure period, other methods may be adopted for such determination without using the timer beamFailureRecoveryTimer.

In the following, specific examples are provided to illustrate the other preferred embodiments of the present invention.

Example 1

In this example, the MAC layer entity of the UE defines a beam failure instance timer beamFailureInstanceTimer. The timer value set when the timer is initiated can be a fixed value or a parameter configured by an upper layer protocol.

When the MAC layer entity of the UE receives an indication of "beam failure instance" from the lower layers, the following steps are performed:

If the timer beamFailureRecoveryTimer is not running, and the timer beamFailureInstanceTimer is running, then the timer beamFailureInstanceTimer is stopped and reset;

If the timer beamFailureRecoveryTimer is not running and the accumulative value of the beam failure instance counter Beam-Failure-Instance-Count exceeds the Beam-Failure-Instance-MaxCount, then the beam failure recovery procedure is initiated.

If the timer beamFailureInstanceTimer expires, then the value of the beam failure instance counter Beam-Failure-Instance-Count may be adjusted through one of the following two methods:

Method 1: reset the beam failure instance counter Beam-Failure-Instance-Count (i.e., set the Beam-Failure-Instance-Count=0).

Method 2: adjust the value of the beam failure instance counter Beam-Failure-Instance-Count through one of the following two formulas:

Beam-Failure-Instance-Count=floor(delta*Beam-Failure-Instance-Count)+1, or

Beam-Failure-Instance-Count=ceil(delta*Beam-Failure-Instance-Count)+1, where floor (.) is a function, and the function value thereof is the largest integer that is not greater than the independent variable; ceil (.) is a function, and the function value thereof is the smallest integer that is not less than the independent variable; delta may be a fixed value or a parameter configured by an upper layer protocol. Delta is used to set the weight of the historical count value of Beam-Failure-Instance-Count in the updated count value.

In the present invention, if the timer expires, the operation is automatically stopped; and if the timer is stopped before expiration, then the timer may be processed in the following two methods:

Method 1: the timer is stopped, and the timer value is reset; and when initiated next time, the timer is initiated with the initial value;

Method 2: the timer is stopped, and the timer value is retained; and when initiated next time, the timer is initiated with the timer value retained when stopped last time.

This processing manner for the timer will also be the same in the following examples or embodiments.

For example, using the language in the MAC protocol, the scheme can be described as follows:

---

1> upon RRC connection establishment:
    2> initiate Beam-Failure-Instance-Count to 0;
...
1> if a beam failure instance has been received from lower layers, and;
1> if beamFailureRecoveryTimer is not running:
    2> stop beamFailureInstanceTimer;
    2> increment Beam-Failure-Instance-Count by 1;
    2> if Beam-Failure-Instance-Count exceeds Beam-Failure-Instance-MaxCount:
        3> reset Beam-Failure-Instance-Count;
        3> start beamFailureRecoveryTimer;
        3> initiate a Random Access procedure.
    2> else:
        3> start beamFailureInstanceTimer;
...
1> if the beamFailureInstanceTimer expires:
    2> reset Beam-Failure-Instance-Count.

---

Figure 2A:
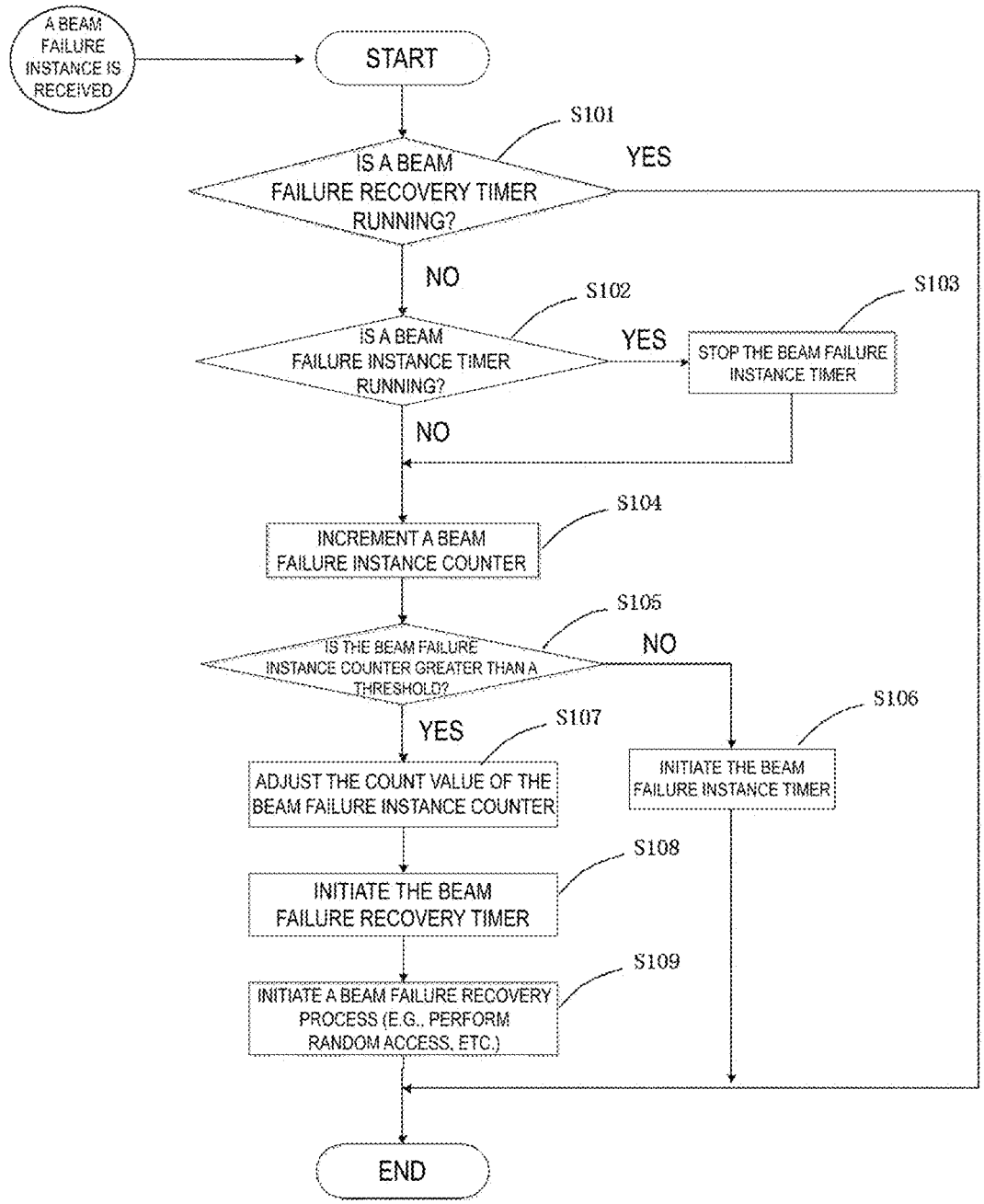
FIG. 2A is a flow chart showing a beam failure recovery method according to Example 1 of the present invention.
Figure 2B:
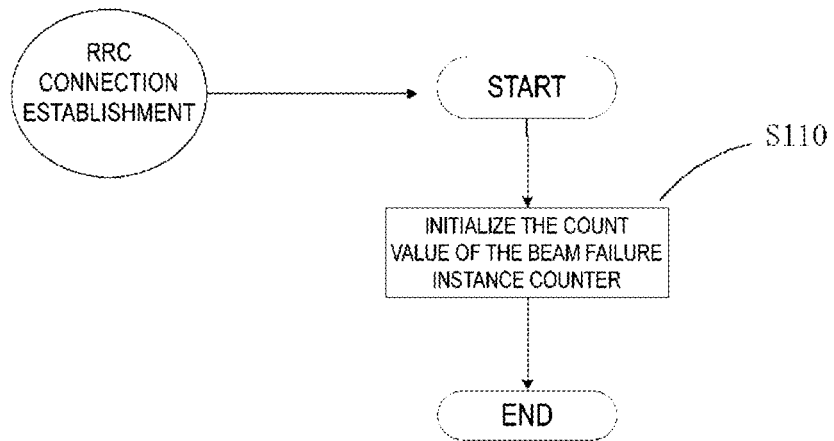
FIG. 2B is a flow chart showing a beam failure recovery method according to Example 1 of the present invention.
Figure 2C:
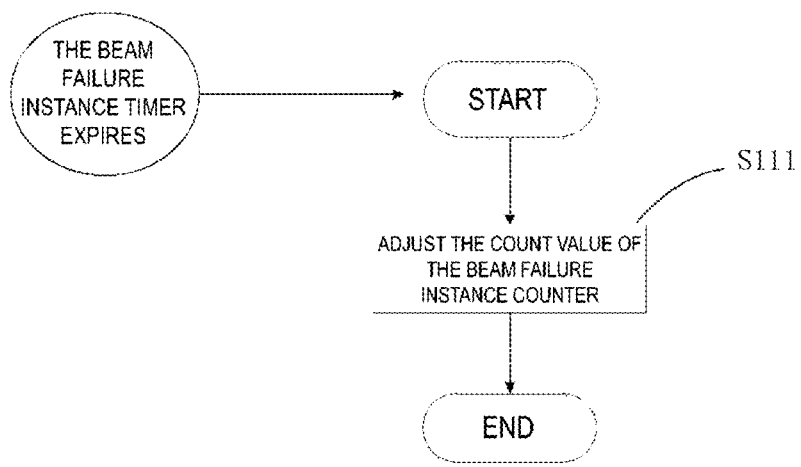
FIG. 2C is a flow chart showing a beam failure recovery method according to Example 1 of the present invention.

FIG. 2A, FIG. 2B and FIG. 2C are flow charts showing a beam failure recovery method according to Example 1 of the present invention.

As shown in FIG. 2A, when an indication of beam failure instance is received, the process proceeds to Step S101. In Step S101, it is determined whether the beam failure recovery timer (beamFailureRecoveryTimer) is running. If the beam failure recovery timer is running (Step S101, "YES"), then the process is ended. If the beam failure recovery timer is not running (Step S101, "NO"), then the process proceeds to Step S102, and it is determined whether the beam failure instance timer (beamFailureInstanceTimer) is running. If the beam failure instance timer is running (Step S102, "YES"), then the beam failure instance timer is stopped (Step S103). If the beam failure instance timer is not running (Step S102, "NO"), then the process proceeds to Step S104, to increment the count value of the beam failure instance counter (Beam-Failure-Instance-Count). If it is determined in Step S105 that the count value of the beam failure instance counter is greater than the threshold (Step S105, "YES"), then the count value of the beam failure instance counter is adjusted (Step S107); the beam failure recovery timer is initiated (Step S108); and the beam failure recovery process (such as performing random access, etc.) is initiated (Step S109). If it is determined as "NO" in Step S105, then the process proceeds to Step S106; in Step S106, a beam failure instance timer (beamFailureInstanceTimer) is initiated. The timer value set when the timer is initiated can be a fixed value or a parameter configured by an upper layer protocol.

In this example, as shown in FIG. 2B, when the RRC connection is established, the count value of the beam failure instance counter is initialized (Step S110). In this example as shown in FIG. 2C, if the beam failure instance timer expires, the count value of the beam failure instance counter is adjusted (Step S111).

In this example, when the count value of the beam failure instance counter is adjusted, either one of the above two methods may be adopted, or other methods may be adopted.

As described above, in an embodiment of the present invention, in the user equipment (UE), when an indication of beam failure instance is received, the number of received indications is accumulated so as to obtain an accumulative value, and when the accumulative value is greater than the first threshold, the beam failure recovery procedure is initiated. If no other indication is received within a time duration equal to a second threshold since the reception of the indication, the accumulative value is adjusted.

According to this embodiment, the elapsed time since the occurrence of the most recent beam failure instance is monitored, and if the time is too long, it is an indication that the previously accumulated beam failure instances may have already been meaningless, and it is not necessary to use them for the determination of the subsequent beam failure(s). Through adjusting the accumulative value of the beam failure instances when the elapsed time since the occurrence of the most recent beam failure instance exceeds a threshold, false beam failures can be eliminated.

Example 2

In this example, the MAC layer entity of the UE defines a beam failure reset timer beamFailureResetTimer. The timer value set when the timer is initiated can be a fixed value or a parameter configured by an upper layer protocol.

When the beam failure instance counter (Beam-Failure-Instance-Count) is initialized (e.g., when the RRC connection is established), the timer beamFailureResetTimer is initiated. In addition, the timer beamFailureResetTimer can also be initiated when the beam failure recovery fails, or initiated by an upper layer indication.

When the MAC layer entity of the UE receives an indication of "beam failure instance" from the lower layers, if the timer beamFailureRecoveryTimer is not running, and the accumulative value of the beam failure instance counter Beam-Failure-Instance-Count exceeds the Beam-Failure-Instance-MaxCount (in other words, the UE determines that a beam failure has occurred, and then beam failure related processing is to be performed), and if the timer beamFailureResetTimer is running, then the timer beamFailureResetTimer is stopped and reset.

If the timer beamFailureResetTimer expires, the timer beamFailureResetTimer is reinitiated, and then the beam failure instance counter Beam-Failure-Instance-Count is adjusted through one of the following two methods:

Method 1: reset the beam failure instance counter Beam-Failure-Instance-Count (i.e., set the Beam-Failure-Instance-Count=0).

Method 2: adjust the value of the beam failure instance counter Beam-Failure-Instance-Count through one of the following two formulas:

Beam-Failure-Instance-Count=floor(delta*Beam-Failure-Instance-Count)+1, or

Beam-Failure-Instance-Count=ceil(delta*Beam-Failure-Instance-Count)+1, where floor (.) is a function, and the function value thereof is the largest integer that is not greater than the independent variable; ceil (.) is a function, and the function value thereof is the smallest integer that is not less than the independent variable; delta may be a fixed value or a parameter configured by an upper layer protocol. Delta is used to set the weight of the historical count value of Beam-Failure-Instance-Count in the updated count value.

For example, using the language in the MAC protocol, the scheme can be described as follows:

```
1> upon RRC connection establishment:
    2> initiate Beam-Failure-Instance-Count to 0;
    2> start beamFailureResetTimer;
...
1> upon unsuccessful beam failure recovery:
    2> initiate Beam-Failure-Instance-Count to 0;
    2> start beamFailureResetTimer;
...
1> if a beam failure instance has been received from lower layers, and;
1> if beamFailureRecoveryTimer is not running:
    2> increment Beam-Failure-Instance-Count by 1;
    2> if Beam-Failure-Instance-Count exceeds Beam-Failure-Instance-MaxCount:
        3> reset Beam-Failure-Instance-Count;
        3> start beamFailureRecoveryTimer;
        3> stop beamFailureResetTimer;
        3> initiate a Random Access procedure.
...
1> if the beamFailureResetTimer expires:
    2> reset Beam-Failure-Instance-Count;
    2> start beamFailureResetTimer.
```

This scheme can also be described as follows using the language in the MAC protocol. X may be equal to Beam-Failure-Instance-MaxCount, and "more than X consecutive beam failure instances" may also be written as "Y consecutive beam failure instances," where Y may be equal to Beam-Failure-Instance-MaxCount+1.

```
1> upon RRC connection establishment:
    2> initiate the counter used for consecutive beam failure instances to 0;
    2> start beamFailureResetTimer;
...
1> upon unsuccessful beam failure recovery:
    2> initiate the counter used for consecutive beam failure instances to 0;
    2> start beamFailureResetTimer;
...
1> if more than X consecutive beam failure instances have been received from lower layers, and;
1> if beamFailureRecoveryTimer is not running:
    2> start beamFailureRecoveryTimer;
    2> stop beamFailureResetTimer;
    2> initiate a Random Access procedure.
...
1> if the beamFailureResetTimer expires:
    2> reset the counter used for consecutive beam failure instances;
    2> start beamFailureResetTimer.
```

Figure 3A:
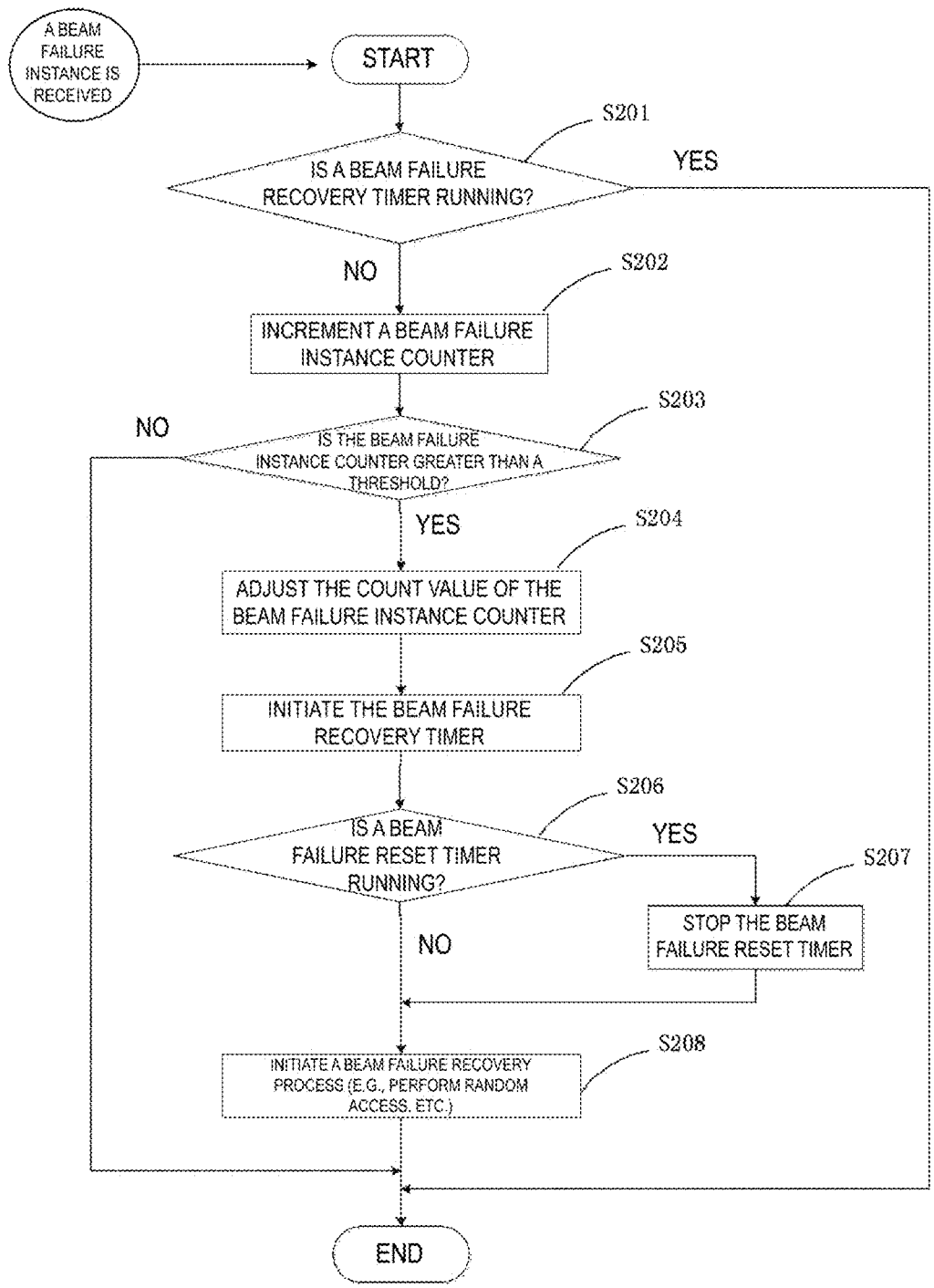
FIG. 3A is a flow chart showing a beam failure recovery method according to Example 2 of the present invention.
Figure 3B:
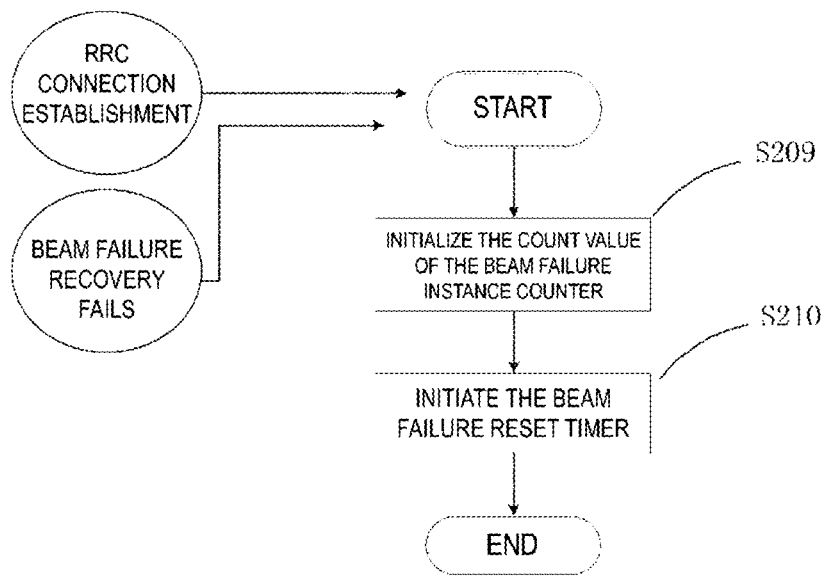
FIG. 3B is a flow chart showing a beam failure recovery method according to Example 2 of the present invention.
Figure 3C:
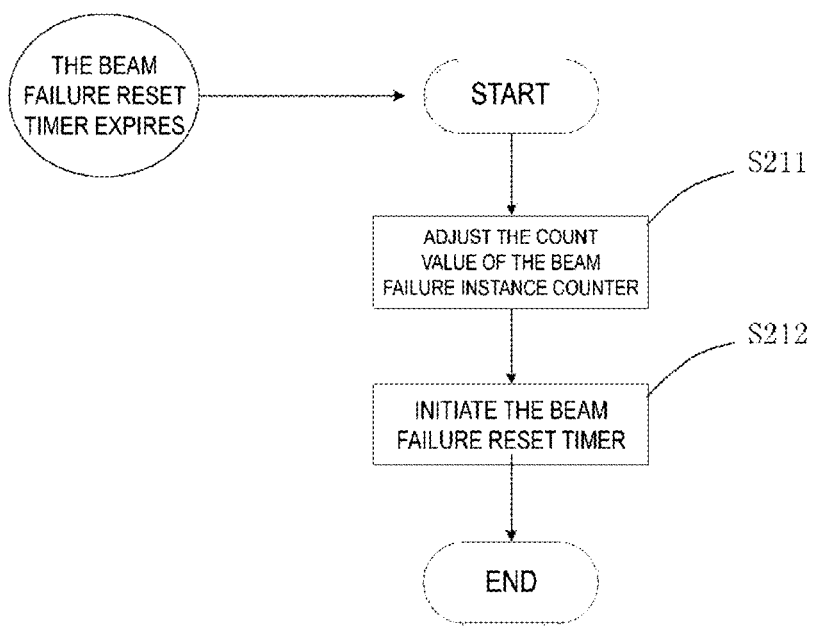
FIG. 3C is a flow chart showing a beam failure recovery method according to Example 2 of the present invention.

FIG. 3A, FIG. 3B and FIG. 3C are flow charts showing a beam failure recovery method according to Example 2 of the present invention.

As shown in FIG. 3A, when an indication of beam failure instance is received, the process proceeds to Step S201. In Step S201, it is determined whether the beam failure recovery timer (beamFailureRecoveryTimer) is running. If the beam failure recovery timer is running (Step 201, "YES"), then the process is ended, and if the beam failure recovery timer is not running (Step S201 "NO"), then the process proceeds to Step S202, and the count value of the beam failure instance counter (Beam-Failure-Instance-Count) is incremented.

Then, the process proceeds to Step S203, where it is determined whether the count value of the beam failure instance counter exceeds a threshold (Beam-Failure-Instance-MaxCount). If the determination in Step S203 is "NO," then the process is ended. If the determination in Step S203 is "YES," then the count value of the beam failure instance counter is adjusted (Step S204), and the beam failure recovery timer is initiated (Step S205). Then, it is determined whether the beam failure reset timer (beamFailureResetTimer) is running (Step S206); if the determination is "YES," then the beam failure reset timer is stopped (Step S207), and then the process proceeds to Step S208; and if it is determined that the beam failure reset timer is not running (Step S206, "NO"), then the process proceeds to Step S208 to initiate the beam failure recovery process (such as performing random access, etc.).

When the count value of the beam failure instance counter is adjusted, either one of the above two methods may be adopted, or other methods may be adopted.

In this example, as shown in FIG. 3B, when the RRC connection is established, or when the beam failure recovery fails, the count value of the beam failure instance counter is initialized (Step S209), and the beam failure reset timer is initiated (Step S210). In this example, as shown in FIG. 3C, if the beam failure reset timer expires, the count value of the beam failure instance counter is adjusted (Step S211), and the beam failure reset timer is initiated (Step S212).

In this example, when the count value of the beam failure instance counter is adjusted, either one of the above two methods may be adopted, or other methods may be adopted.

As described above, in an embodiment of the present invention, in the user equipment (UE), when an indication of beam failure instance is received, the number of received indications is accumulated so as to obtain an accumulative value; when the accumulative value is greater than the first threshold, the beam failure recovery procedure is initiated; if the accumulative value accumulated within a given time, i.e., within the range of the second threshold is not greater than the first threshold, then the accumulative value is adjusted.

According to this embodiment, the total time for occurrences of Beam-Failure-Instance-MaxCount "beam failure instances," which is required to satisfy the "beam failure" conditions, can be limited within a certain range. If the value of the beam failure instance counter does not reach Beam-Failure-Instance-MaxCount within a given time, the value of the counter is adjusted, e.g., reset to zero, to proceed to a next evaluation cycle. Thus, it is possible to eliminate false beam failures.

Example 3

In this embodiment, the MAC layer entity of the UE defines a beam failure declaration timer beamFailureDeclarationTimer. The timer value set when the timer is initiated can be a fixed value or a parameter configured by an upper layer protocol.

In this example, the physical layer entity of the UE indicates a "beam success instance" to the MAC layer entity of the UE when certain conditions are met. These conditions may include:

1. the measured values of all reference signals used for beam failure measurement (expressed as an error probability) are all less than a predetermined threshold;

2. one or more of the measured values of reference signals used for beam failure measurement (expressed as an error probability) are less than a predetermined threshold;

3. the UE detects, in the configured CORESET, at least one instance of DCI transmitted to the UE (i.e., the DCI is scrambled by the C-RNTI allocated to the UE). The configured control resource set may be an operating control resource set, or a control resource set specially configured for beam failure recovery, or a combination of the two.

When the MAC layer entity of the UE receives more than Beam-Success-Instance-MaxCount (Beam-Success-Instance-MaxCount may be 1, or other fixed positive integer values, or a configurable RRC parameter) consecutive indications of "beam success instances," and if the timer beamFailureRecoveryTimer is not running, and if the timer beamFailureDeclarationTimer is running, then the timer beamFailureDeclarationTimer is stopped and reset.

When the MAC layer entity of the UE receives more than Beam-Failure-Instance-MaxCount (Beam-Success-Instance-MaxCount may be 1, or other fixed positive integer values, or a configurable RRC parameter) consecutive indications of "beam failure instances," and if the timer beamFailureRecoveryTimer is not running, then the timer beamFailureDeclarationTimer is initiated.

If the timer beamFailureDeclarationTimer expires (when this condition is met, it is considered that a beam failure has occurred), then the timer beamFailureRecoveryTimer is initiated, and a beam failure recovery request is initiated (e.g., a random access procedure is initiated to transmit a "beam failure recovery request" to a base station).

For example, using the language in the MAC protocol, the scheme can be described as follows:

1> if Y consecutive beam failure instances have been received from lower layers, and;
1> if beamFailureRecoveryTimer is not running:
    2> start beamFailureDeclarationTimer;
1> if X consecutive beam success instances have been received from lower layers, and;

-continued

1> if beamFailureRecoveryTimer is not running:
    2> stop beamFailureDeclarationTimer
1> if the beamFailureDeclarationTimer expires;
    2> start beamFailureRecoveryTimer;
    2> initiate a Random Access procedure.

For another example, this scheme can also be described as follows using the language in the MAC protocol:

1> if a beam failure instance has been received from lower layers, and;
1> if beamFailureRecoveryTimer is not running:
    2> increment Beam-Failure-Instance-Count by 1;
    2> if Beam-Failure-Instance-Count exceeds Beam-Failure-Instance-MaxCount:
        3> start beamFailureDeclarationTimer;
...
1> if a beam success instance has been received from lower layers, and;
1> if beamFailureRecoveryTimer is not running:
    2> increment Beam-Success-Instance-Count by 1;
    2> if Beam-Success-Instance-Count exceeds Beam-Success-Instance-MaxCount:
        3> stop beamFailureDeclarationTimer;
...
1> if the beamFailureDeclarationTimer expires;
    2> reset Beam-Failure-Instance-Count;
    2> reset Beam-Success-Instance-Count;
    2> start beamFailureRecoveryTimer;
    2> initiate a Random Access procedure.

FIG. 4A, FIG. 4B, FIG. 4C and FIG. 4D are flow charts showing a beam failure recovery method according to Example 3 of the present invention.

Figure 4A:
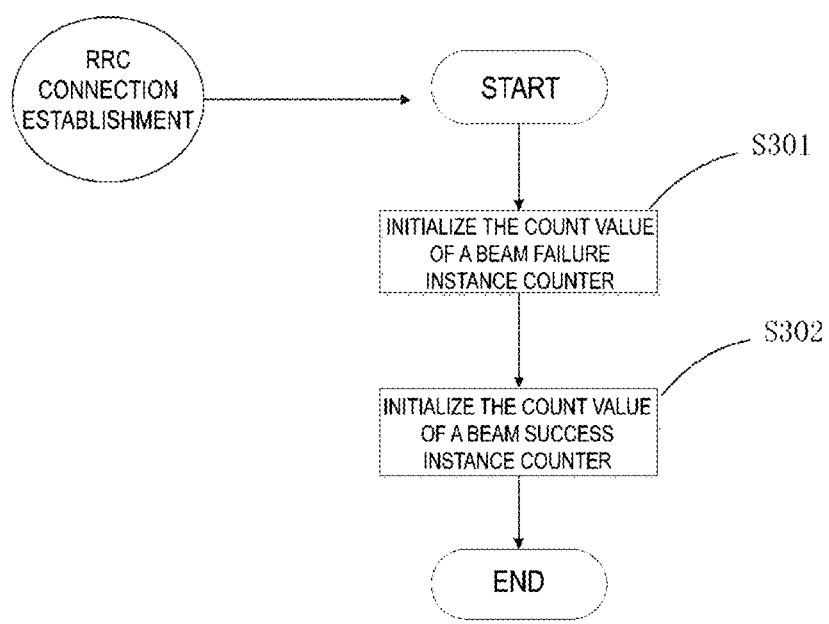
FIG. 4A is a flow chart showing a beam failure recovery method according to Example 3 of the present invention.

In this example, as shown in FIG. 4A, when the RRC connection is established, the count value of the beam failure instance counter (Beam-Failure-Instance-Count) is initialized (Step S301), and then the count value of the beam success instance counter (Beam-Success-Instance-Count) is also initialized (Step S302).

Figure 4B:
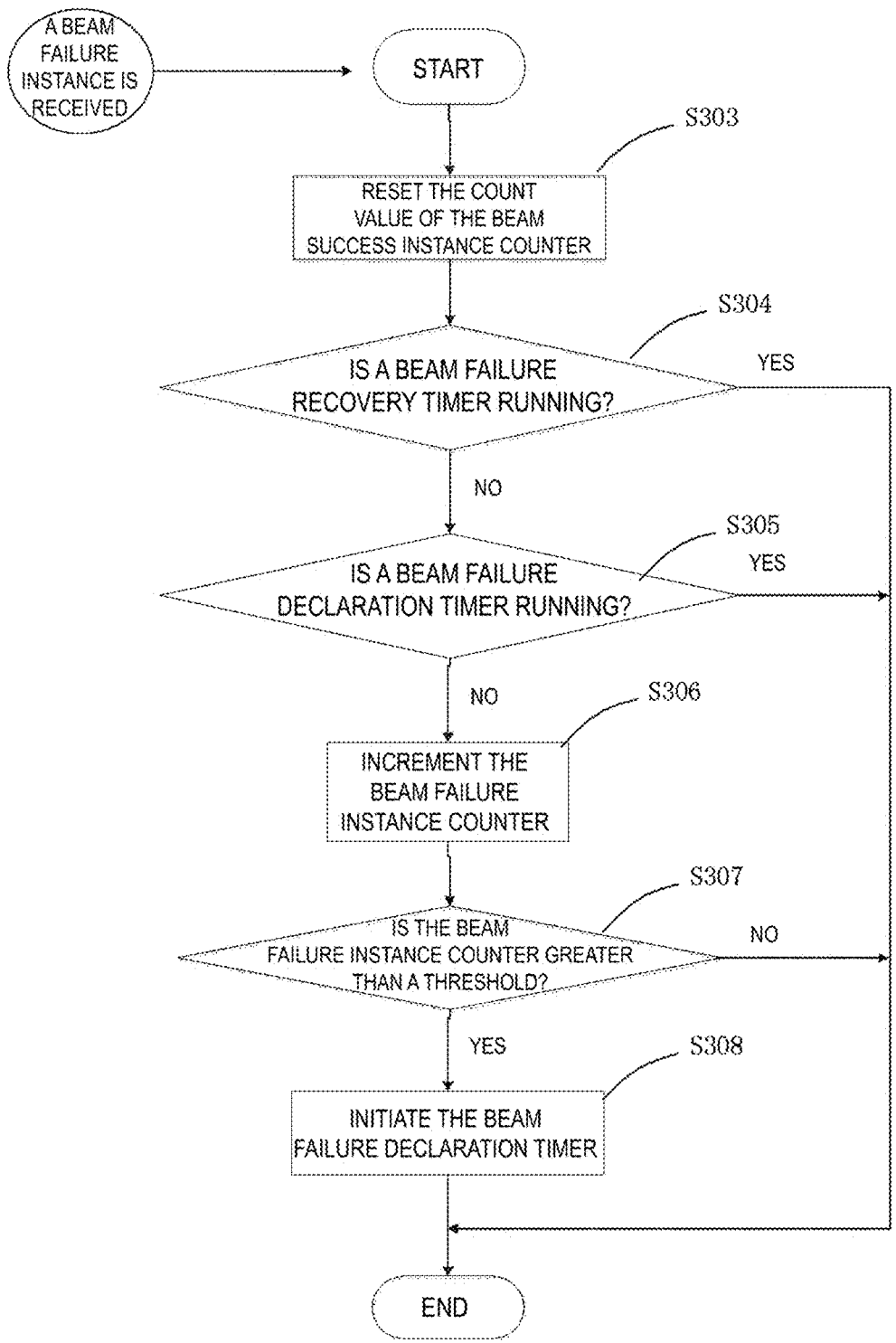
FIG. 4B is a flow chart showing a beam failure recovery method according to Example 3 of the present invention.

As shown in FIG. 4B, when an indication of beam failure instance is received, the process proceeds to Step S303. In Step S303, the count value of the beam success instance counter is reset. Then, it is determined whether the beam failure recovery timer (beamFailureRecoveryTimer) is running (Step S304). If the beam failure recovery timer is running (Step S304, "YES"), then the process is ended, and if the beam failure recovery timer is not running (Step S304, "NO"), then the process proceeds to Step S305, where it is determined whether the beam failure declaration timer (beamFailureDeclarationTimer) is running; and if the determination is "YES," then the process is ended. If it is determined that the beam failure declaration timer is not running (Step S305, "NO"), the process proceeds to Step S306 to increment the count value of the beam failure instance counter (Beam-Failure-Instance-Count).

Then, the process proceeds to Step S307, where it is determined whether the count value of the beam failure instance counter exceeds a threshold (Beam-Failure-Instance-MaxCount). If the determination in Step S307 is "NO," then the process is ended. If the determination in Step S307 is "YES," then the beam failure declaration timer is initiated (Step S308).

Figure 4C:
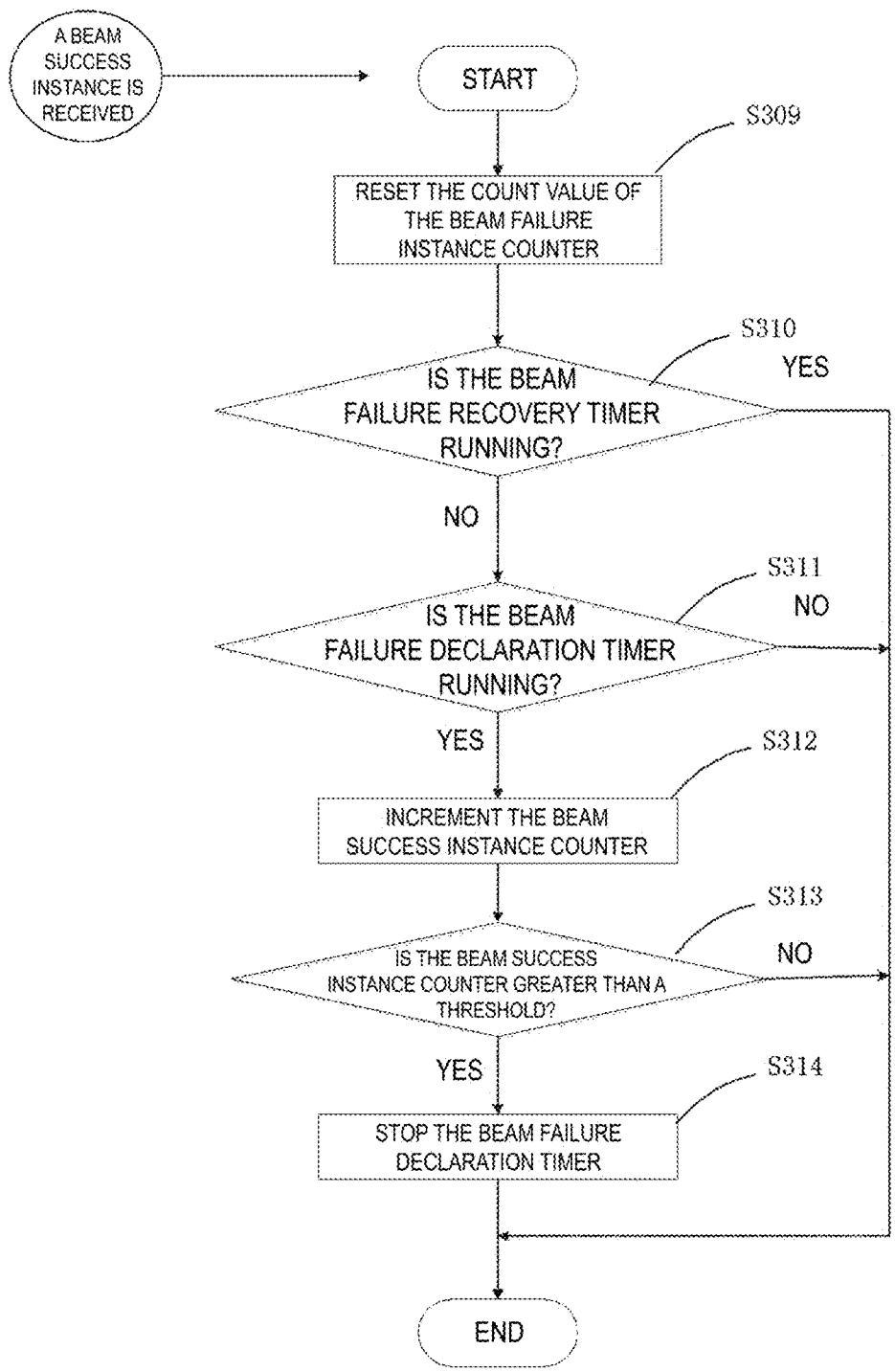
FIG. 4C is a flow chart showing a beam failure recovery method according to Example 3 of the present invention.

As shown in FIG. 4C, when an indication of beam success instance is received, the process proceeds to Step S309. In Step S309, the count value of the beam failure instance counter is reset. Then, it is determined whether the beam failure recovery timer (beamFailureRecoveryTimer) is running (Step S310). If the beam failure recovery timer is running (Step S310, "YES"), then the process is ended, and if the beam failure recovery timer is not running (Step S310, "NO"), then the process proceeds to Step S311, where it is determined whether the beam failure declaration timer (beamFailureDeclarationTimer) is running; and if the determination is "NO," then the process is ended. If it is determined that the beam failure declaration timer is running (Step S311, "YES"), the process proceeds to Step S312 to increment the count value of the beam success instance counter.

Then, the process proceeds to Step S313, where it is determined whether the count value of the beam success instance counter exceeds a threshold (Beam-Success-Instance-MaxCount). If the determination in Step S313 is "NO," then the process is ended. If the determination in Step S313 is "YES," then the beam failure declaration timer is stopped (Step S314).

Figure 4D:
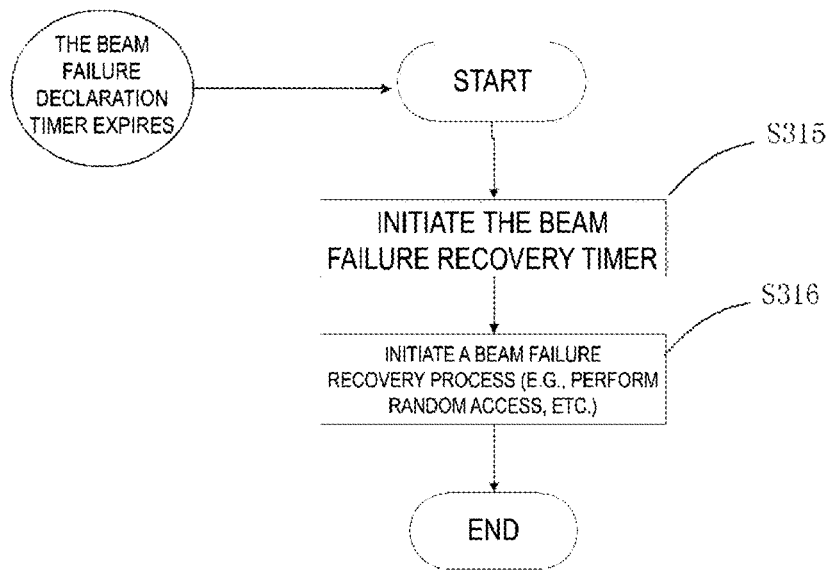
FIG. 4D is a flow chart showing a beam failure recovery method according to Example 3 of the present invention.

In this example, as shown in FIG. 4D, if the beam failure declaration timer expires, the beam failure recovery timer is initiated (Step S315), and the beam failure recovery process (such as performing random access, etc.) is initiated (Step S316).

As described above, in an embodiment of the present invention, in the user equipment (UE), when an indication of beam failure instance is received, the number of received indications is accumulated so as to obtain an accumulative value; and timing is started when the accumulative value reaches the first threshold, and the beam failure recovery procedure is initiated when the elapsed time is greater than or equal to a given time, i.e., the second threshold. In addition, preferably, when an indication of beam success instance is received, the number of received indications of beam success instance is accumulated so as to obtain an accumulative value; and when the accumulative value is greater than or equal to a third threshold, timing of the elapsed time is stopped.

According to this embodiment, the "beam failure instance" and the "beam success instance" can be independently counted, and the "beam failure instance" can be cleared according to the accumulative result of the "beam success instance." Thus, it is possible to eliminate false beam failures.

Figure 5:
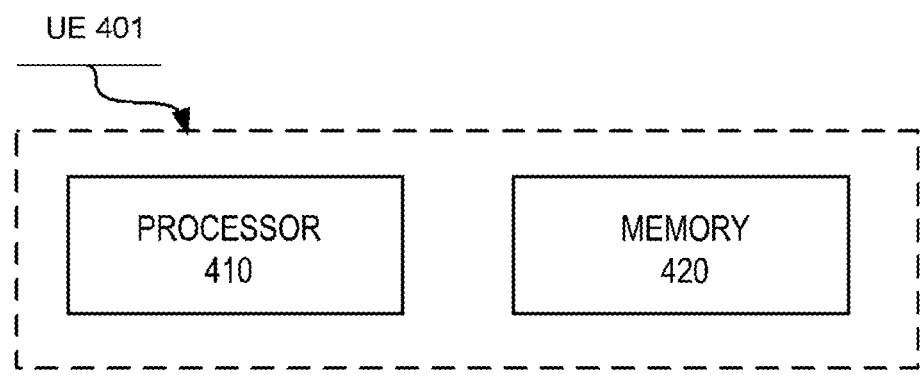
FIG. 5 is a block diagram showing user equipment according to an example of the present invention.

FIG. 5 is a block diagram showing user equipment 401 according to an example of the present invention. As shown in FIG. 5, the user equipment 401 includes a processor 410 and a memory 420. The processor 410 may include, for example, a microprocessor, a microcontroller, an embedded processor and so on. The memory 420 may include, for example, a volatile memory (for example, a random access memory (RAM)), a hard disk drive (HDD), a non-volatile memory (for example, a flash memory), or other memories. Program instructions are stored on the memory 420. The instructions, when executed by the processor 410, can perform the aforementioned method performed by the user equipment as described in detail in the present disclosure.

Each of the above-described examples and embodiments can be combined with each other if no contradiction is caused. For example, it is possible to arbitrarily combine the case considering the elapsed time since the occurrence of the most recent beam failure instance, the case considering that the value of the beam failure instance counter cannot reach the threshold within a given time, and the case considering the beam success instances. Through combining any of the examples and the embodiments arbitrarily, it is possible to further eliminate false beam failures.

Further, in the present invention, in some examples, receiving an indication of beam failure instance may be consecutively receiving indications of beam failure instance; and additionally, receiving indication of beam success instance may be consecutively receiving indications of beam success instance.

Herein, in the case of consecutively receiving indications of beam failure instance, for two given indications of beam failure instance, it is considered these two indications of beam failure instance are consecutive only when no other indication of beam failure instance or indication associated with the beam failure instance (e.g., indication of beam success instance) occurs between the points-in-time of these two indications. In this case, only the instances of beam failures that are consecutively received are accumulated.

In the case of consecutively receiving indications of beam success instance, for two given indication of beam success instance, it is considered these two indications of beam success instance are consecutive only when no other indication of beam success instance or indication associated with the beam success instance (e.g., indication of beam failure instance) occurs between the points-in-time of these two indications. In this case, only the instances of the beam successes that are consecutively received are accumulated.

The methods and related devices according to the present invention have been described above in conjunction with the preferred embodiments. It should be understood by those skilled in the art that the methods shown above are only exemplary. The method of the present invention is not limited to steps or sequences illustrated above. The network node and the user equipment illustrated above may include more modules; for example, they may further include modules which can be developed or developed in the future to be applied to modules of a base station, an MME, or UE. Various identifiers shown above are only exemplary, and are not meant for limiting the present invention. The present invention is not limited to specific information elements serving as examples of these identifiers. Those skilled in the art can make various alterations and modifications according to the teachings of the illustrated embodiments.

It should be understood that the embodiments above of the present invention can be implemented by software, hardware or a combination of the software and the hardware. For example, various components inside the base station and the user equipment in the embodiments above can be implemented by various devices, and these devices include, but are not limited to: an analog circuit device, a digital circuit device, a Digital Signal Processor (DSP) circuit, a programmable processor, an Application Specific Integrated Circuit (ASIC), a Field Programmable Gate Array (FPGA), a Complex Programmable Logic Device (CPLD) and the like.

In the present application, the term "base station" refers to a mobile communication data and control switching center with a larger transmit power and a wider coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer and the like.

Moreover, the embodiments of the present invention disclosed herein can be implemented on a computer program product. More particularly, the computer program product is a product as follows: a product having a computer readable medium encoded with computer program logic thereon, when being executed on a computing equipment, the computer program logic provides related operations to implement the technical solution of the prevent invention. When being executed on at least one processor of a computing system, the computer program logic enables the processor to execute the operations (methods) described in the embodiments of the present invention. Such setting of the present invention is typically provided as software, codes and/or other data structures provided or encoded on the computer readable medium, e.g., an optical medium (e.g., Compact Disc Read Only Memory (CD-ROM)), a flexible disk or a hard disk and the like, or other media such as firmware or micro codes on one or more Read Only Memory (ROM) or Random Access Memory (RAM) or Programmable Read Only Memory (PROM) chips, or a downloadable software image, a shared database and the like in one or more modules. The software or the firmware or such configuration can be installed on the computing equipment, so that one or more processors in the computing equipment execute the technical solution described in the embodiments of the present invention.

In addition, each functional module or each feature of the base station device and the terminal device used in each of the above embodiments may be implemented or executed by a circuit, which is usually one or a plurality of integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general-purpose processor may be a microprocessor; or the processor may be an existing processor, a controller, a microcontroller, or a state machine. The above-mentioned general-purpose processor or each circuit may be configured with a digital circuit, or may be configured with a logic circuit. In addition, when an advanced technology that can replace current integrated circuits emerges due to advances in semiconductor technology, the present invention may also use integrated circuits obtained using this advanced technology.

Although the present invention is already illustrated above in conjunction with the preferred embodiments of the present invention, those skilled in the art should understand that, without departing from the spirit and scope of the present invention, various modifications, replacements and changes can be made to the present invention. Therefore, the present invention should not be defined by the above embodiments, but should be defined by the appended claims and equivalents thereof.

The invention claimed is:
1. A method performed by user equipment, comprising:
receiving a beam failure instance indication from lower layers;
incrementing a counter for the beam failure instance indication by 1, on the basis of a determination that the beam failure instance indication has been received from lower layers;
resetting the counter to 0 if no beam failure instance indication is received within a time threshold; and
initiating a random access procedure if the counter exceeds a specific value.
2. A user equipment, comprising;
a processor; and
a memory in electronic communication with the processor, wherein, instructions stored in the memory are executable to:
receive a beam failure instance indication from lower layers;
increment a counter for the beam failure instance indication by 1, on the basis of a determination that the beam failure instance indication has been received from lower layers;
reset the counter to 0 if no beam failure instance indication is received within a time threshold; and
initiate a random access procedure if the counter exceeds a specific value.

* * * * *